United States Patent Office 3,499,864
Patented Mar. 10, 1970

3,499,864
HEAT STABLE STORABLE, ONE PART POLYTHIOL COMPOSITIONS WITH AMINE-LOADED MOLECULAR SIEVES
Edward Millen, 246 Cold Soil Road,
Princeton, N.J. 08540
No Drawing. Continuation-in-part of application Ser. No. 662,283, Aug. 22, 1967. This application Aug. 19, 1968, Ser. No. 753,764
Int. Cl. C08g 23/20, 43/00
U.S. Cl. 260—33.8     20 Claims

ABSTRACT OF THE DISCLOSURE

One-part polymer compositions comprising (a) a curable, liquid polythiol polymer, (b) a dormant amine activatable curing agent, (c) a desiccating, hygroscopic accelerating agent, and (d) an amine-loaded molecular sieve which are characterized by excellent storage stability at temperate ambient temperatures and undergo relatively fast cures when exposed to moisture or a moisture-laden atmosphere, are improved and rendered storage stable at elevated ambient temperatures by containing in the compositions (e) a stabilizing amount of elemental sulfur. The compositions are useful as sealants and caulking compounds, especially in hot climates and under elevated storage temperatures.

CROSS REFERENCE

This application is a continuation-in-part of Ser. No. 662,283, filed Aug. 22, 1967, now abandoned.

BACKGROUND OF THE INVENTION

Field of the invention

This invention relates to an improved one-part, stable, curable composition comprising —SH group-containing liquid polymer (herein-after called polythiol polymer). More particularly, this invention relates to an improved one-part, elevated ambient temperature stable, curable polythiol polymer based composition which has incorporated therein (1) a dormant activatable, e.g. zinc oxide or zinc peroxide, curing agent (2) a desiccating, hygroscopic accelerating agent, (3) a zeolitic molecular sieve loaded with an amine compound accelerating agent, and (4) a stabilizing amount of elemental sulfur.

Liquid —SH containing polymers are used extensively in sealants and caulking compositions, especially in the building and automotive industries; for castings, e.g. solid rocket propellants; for leather and textile impregnating agents; for adhesives, coatings, etc.

Depending upon the requirements of the particular application, and the nature of the cure systems, the components of the curable liquid —SH containing polymer systems may be packaged as one or two part systems. One part systems are those in which all the components are stored together with no appreciable reaction taking place until activated by some external influence, such as heat, surface application of curing accelerators, exposure to moisture in the atmosphere, etc. Such moisture activatable compositions are described in U.S. Patents 3,225,017 and 3,215,677.

Two part systems are those in which the reactive components are stored in separate packages and combined just prior to use. This type of system is most common and usually involves the storage of liquid polymer and curing agent in separate packages, as, for example, in the case of $PbO_2$ cured liquid polyalkylene polysulfide compositions. In another package arrangement, the polymer and curing agent may be stored in one package with a suitable accelerator or activator being stored in a second package.

Liquid polymer containing a plurality of —SH groups may be cured with compounds which react with the —SH groups in such a way as to condense or unite lower molecular weight segments to form higher molecular weight solid materials. Commonly, such polymers are oxidatively cured with organic or inorganic oxidizing agents whereby pairs of —SH groups in the liquid polymers are oxidized to —SS— groups thus promoting the formation of solid higher molecular weight materials. Zinc oxide and zinc peroxide have been suggested as curing agents for —SH containing polymers in U.S. 2,466,963 and U.S. 3,275,579, with basic activators, but such systems have poor package stability, particularly for one package sealant application, since the base appears to accelerate the curing action of the zinc compound on the polymer. The zinc oxide or zinc peroxide cured polymers also exhibit poor heat aging characteristics in that on prolonged heat aging the cured systems tend to undergo severe cracking and "chalking," that is, the cured systems acquire a "chalk-like" consistency which is accompanied by a corresponding deterioration in physical properties.

Zinc oxide and zinc peroxide are not moisture activated cure agents in the cure of —SH containing polymers. In the presence of moisture alone, therefore, these curing agents will not cure these polymers. Curing agents such as lead dioxide, calcium peroxide, lithium peroxide, barium peroxide, antimony peroxide and manganese dioxide will cure —SH containing polymers in the presence of moisture. All these cure systems require a neutral to basic medium for the cure reaction to proceed.

Description of the prior art

In copending application of Edward F. Kutch, Ser. No. 573,827, filed Aug. 22, 1966, now U.S. 3,402,155, there is disclosed and claimed a polymer composition containing —SH polymer which is activated by the presence of moisture and base. That polymer composition is characterized by having incorporated therein (1) a zeolitic molecular sieve loaded with a basic compound which basic compound is displaced from the molecular sieve in a moisture containing environment and serves as an accelerator for the cure of the composition, and (2) a non-molecular sieve hygroscopic accelerating agent. The polymer composition when exposed to moisture or moisture containing atmosphere, or other moisture containing gaseous vapor which does not adversely interfere with the cure of the polymer composition, picks up moisture due to the hygroscopic nature of the molecular sieves as well as the other hygroscopic accelerating agent. The moisture in turn (1) displaces the basic compound in the molecular sieves and (2) acts in conjunction with the displaced base to accelerate the cure of the polymer composition. The term "accelerate" as used herein means to speed-up and/or initiate the cure of the curable composition.

As can be seen from the above description, one feature of the Kutch invention is the formation of a one-part stable curable polythiol composition by incorporating therein a molecular sieve loaded with a basic compound together with a non-molecular sieve hygroscopic agent which act together as hygroscopic, accelerating agents to produce an exceptionally short cure time when the composition is placed in a moisture containing environment. Another aspect of that invention is that in an environment which is protected from moisture, the base loaded molecular sieve and the non-molecular sieve hygroscopic agent act together as exceptionally good desiccating agents to give the composition very good package stability under relatively temperate ambient conditions, e.g. at about 79° F.

However, experience with the prior known compositions has shown that at ambient temperatures which are elevated significantly above 75° F., but which are within the range of ambient temperatures reached in southern parts of the North American continent and in tropical regions of the world, the package stability of the known composition is drastically reduced. Temperatures in the sun in many such regions may easily exceed 130° F. and may even reach 150° F. It is theorized that elevated temperature drives the basic curing agent from the pores of the molecular sieve causing undesired curing to take place in the package and results in hardened compositions which are unusable as sealants.

The present invention is directed to stabilizing species of the known Kutch compositions so that their package lives are remarkably extended, in many cases by at least 200 days, even at storage temperature of 130° F., and correspondingly longer at room temperature, over the storage life of the known composition.

SUMMARY OF THE INVENTION

It has now been found that at least those species of the above-discussed known compositions which contain amine activatable curing agents, particularly zinc oxide and/or zinc peroxide as the dormant curing agent for —SH containing polymers can be rendered stable against premature cure of the polymer in a one package system by the use in such system of a relatively minor amount of elemental sulfur as a stabilizing agent to deter curing of the composition in the package. It has also been found that the heat aging properties of such cured systems can be substantially improved by using as a co-curing agent for the —SH containing polymers, moisture activatable co-curing agents, such as, calcium peroxide, lithium peroxide, lead peroxide, antimony peroxide, barium peroxide and manganese dioxide. Calcium peroxide is especially preferred for such use in white sealants. The present cure systems are adaptable for use in both two package and one package sealant systems especially for storage and use in hot climates and in hot storage areas. They may be readily activated by exposure of the systems to moisture in the atmosphere and will thereafter cure to the desired polymeric state of cure within a relatively short period of time acceptable for industrial applications and the like.

It is an object of the present invention, therefore, to provide novel, curable compositions based on —SH containing polymers suitable for use in one part and two part composition applications and particularly suitable for storage and use at ambient temperatures in all warm to hot climates while having good package lives under even the extremes of hot climate temperature.

Elemental sulfur has been previously used as a cure accelerator in the cure of polymercaptan polymer with PbO$_2$. Also, the curing of 100 parts of polymeric mercaptan with a curing system including from 5 to 15 parts of elemental sulfur as curing agent in direct combination with zinc oxide or zinc peroxide and an alkylamine is taught by Warner et al., in U.S. 3,282,901 and by Warner in U.S. 3,234,188. According to these patents, air cures of the compositions at room temperature resulted within 2 to 48 hours, with the sulfur serving as vulcanizing agent. However, the inventors thereof were not concerned with the package life of one package compositions such as those of the present invention, wherein sulfur is present in a minor amount and as a stabilizing agent only, and the alkylamine is held inactive in a molecular sieve until exposed to moisture.

In contrast to the above-taught use of sulfur as a curing agent, the present invention utilizes from about 0.01 to about 4.9 parts of elemental sulfur per 100 parts of liquid polythiol polymer as a storage stabilizing agent in the presence of an amine-loaded molecular sieve cure accelerating agent, dormant amine activated zinc oxide or zinc peroxide curing agent, a desiccating, hydroscopic accelerating agent and curable, liquid polythiol polymer. Cure time for such composition of the present invention, containing 0.3 part of sulfur and cured under 50% humidity conditions at room temperature (75° F.), was found to be in the range of 21–27 days and its package stability at 130° F. was still good after 240 days.

Thus, not only are the compositions of the present invention different in certain critical formulation aspects from those of the prior art invention, but also the storage stability characteristics of the compositions are unobviously distinctive and advantageous for a one package sealant-type composition having long shelf life especially at elevated ambient temperatures.

DESCRIPTION OF THE PREFERRED EMBODIMENTS

The novel compositions of the present invention are based on curable —SH containing polymers. These polymers contain a plurality of —SH groups and include:

(A) Liquid polythiopolymercaptan polymers such as described in U.S. Patent 2,466,963;

(B) Liquid polysulfide polymers containing a plurality of —SSH groups such as described in U.S. Ser. No. 290,637 filed June 26, 1963 now abandoned;

(C) Liquid —SH terminated polyethers such as —SH terminated polypropylene glycol as disclosed in U.S. Patent 3,258,495;

(D) —SH terminated hydrocarbon polymers such as —SH terminated polybutadiene (Chem. and Eng. News, Apr. 4, 1966, p. 37), —SH terminated butadiene/acrylonitrile copolymers and the alkanepolythiol, alkenepolythiol, and arenepolythiol polymers disclosed in U.S. Patents 2,230,390; 2,436,137 and 3,243,411;

(E) Liquid —SH terminated polyurethanes such as are disclosed in U.S. patent application S. N. 484,097 filed Aug. 31, 1965 now Patent No. 3,446,780;

(F) Liquid —SH terminated poly (alkylene sulfide) polymers as are disclosed in U.S. Patents 3,056,841 and 3,070,580; and (G) Other polythiol polymers which are disclosed in 3,402,155, above, which is incorporated herein by way of reference.

More specifically, the polythiol polymers, upon which the compositions of this invention are based, are those polymers containing an average of at least two —SH groups per molecule and include, for exampe, and preferably the liquid polysulfide polymers. The —SH group containing polysulfide polymers upon which the compositions of this invention are based are organic polymeric materials which are liquid at room temperature and which contain recurring polysulfide linkages, i.e., (—S$_n$—) in the polymeric backbone where $n$ is, on the average, about 1.5 to 5. These polymers include, for example, those liquid polythiopolymercaptan polymers as are disclosed, as noted above, in U.S. Patent 2,466,963 and which may be represented by the formula HS(R—S—S)$_n$RSH where R is a hydrocarbon, oxahydrocarbon or thiahydrocarbon radical such as the ethyl formal radical

the butyl formal radical

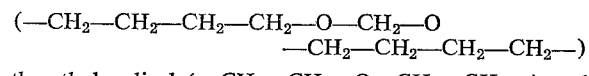

the ethyl radical (—CH$_2$—CH$_2$—O—CH$_2$—CH$_2$—) and the butyl ether radical

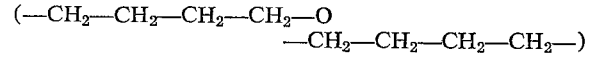

and $n$ will vary from about 2 to 70, and preferably from about 4 to 23. These liquid polysulfide polymers have viscosities ranging from about 300 to about 150,000 centipoises at room temperature. Other —SH group containing polysulfide polymers are the —SSH terminated polymers such as those disclosed in copending application U.S. Serial No. 290,637 filed June 26, 1963, now abandoned, in the name of E. R. Bertozzi and the blocked —SSH terminated polymers such as those disclosed in copending application U.S. Ser. No. 302,724 filed Aug. 16, 1963, now abandoned, in the name of E. R. Bertozzi.

Also useful as polythiol polymers in this invention are, for example, the thiol terminated polythiomethylene polymers such as described in U.S. Patents 3,056,841 and 3,070,580; the thiol terminated polyoxyalkylene glycol polymers such as described in U.S. Patent 3,258,495; the alkanepolythiol, aralkanepolythiol, and arenepolythiol polymers, such as disclosed in the above-mentioned U.S. Patents 2,230,390; 2,436,137; and 3,243,411; the polymeric polymercaptans formed by reacting a plurality of gem dithioether linkages with water in the presence of a catalytically effective amount of strong nonoxidizing acid such as disclosed in U.S. Ser. No. 484,105 filed Aug. 31, 1965 now Patent No. 3,413,265 filed in the name of E. R. Bertozzi, and other polythiol polymers such as described in U.S. Ser. No. 484,118 filed Aug. 31, 1965, now abandoned, in the name of G. F. Bulbenko and L. Citarel; U.S. Ser. No. 484,097 filed Aug. 31, 1965 now Patent No. 3,446,780 in the name of E. R. Bertozzi and U.S. Ser. No. 484,122 filed Aug. 31, 1965 now Patent No. 3,446,775 in the names of E. R. Bertozzi and M. B. Berenbaum.

The —SH containing polymers, according to the present invention, may be used singularly or in various combinations with one another. The curable compositions of the present invention contain about 20 to 60% by weight of such polymers.

The curable compositions of the present invention will contain, as dormant amine activatable curing agent, about 2 to 25 parts by weight of zinc oxide and/or zinc peroxide per 100 parts by weight of polymer in such compositions. The cure systems of the present invention may also include 0.5 to 50 parts by weight, preferably from about 0.5 to 20 parts by weight, per 100 parts by weight of polymer, of one or more moisture activatable dormant co-curing agents for such polymers, preferably calcium peroxide, lithium peroxide, lead peroxide, manganese dioxide, antimony peroxide, barium peroxide, sodium peroxide, sodium carbonate peroxide, sodium perborate and the chromate salts disclosed in U.S. 2,787,608. Calcium peroxide is especially preferred as a co-curing agent. One or both of the zinc oxide and zinc peroxide curing agents may be used in combination with one or more of the moisture activatable curing agents.

The cure systems may also contain in combination with the zinc oxide or zinc peroxide, or mixtures thereof with each other, a minor amount of one or more of the dormant desiccating, hygroscopic accelerating agents, some of which can function as moisture activatable curing agents, taught in 3,402,155, above, more particularly, inorganic oxides such as lead oxide, calcium oxide, ferrous oxide, and ferric oxide; other oxidizing agents such as iodine or oxygen containing salts, e.g., the chromates, manganates, permanganates, and molybdates; the inorganic metal salt peroxides such as the alkali metal and alkaline earth metal salt peroxides; organic peroxides such as the peroxides, hydroperoxide and the like, e.g. benzoyl peroxide, dicumyl peroxide, and cumene hydroperoxide; and other organic oxidizing agents such as p-quinone dioxime, trinitrobenzene, dinitrobenzene, polyepoxide, polyisocyanates, organic titanates, organic borates, and organic silicates.

The amounts and types of particular moisture activatable co-curing agent and hygroscopic accelerating agent which are used will, of course, depend upon the particular polythiol polymer being used, the amount and type of fillers used the particular properties, e.g. color or hardness, desired in the final cured composition, temperature during storage, temperature during cure, and like considerations known to the art.

The element sulfur which may be used according to the teachings of the present invention can be used in any of the commonly available forms of monomeric and polymeric elemental sulfur including rhombic sulfur and monoclinic sulfur. About 0.01 to about 4.9 parts by weight of the elemental sulfur is used per 100 parts by weight of polymer. An amount of sulfur of from about 0.2 to about 3.5 parts per 100 parts by weight of polymer is used in many formulations and is preferably used. However, although a minimum stabilizing amount of elemental sulfur is necessary to obtain the advantages and benefits of the invention, it is to be understood that the use of an excessive amount of elemental sulfur, beyond the stabilizing amount, is not necessary for curing of the polymer in the composition. Also, although more than the stabilizing amount of elemental sulfur may be used, while still obtaining the stabilizing effect of the elemental sulfur, the excess amount of sulfur will not act to cure the polymer in the package during storage. The curing of the polymer, which occurs upon removal of the polymer from a moisture proof container and its exposure to moisture of the air, occurs by displacement of the amine accelerating agent from the molecular sieve by the moisture. Although the mode of reacting is not specifically known, it is believed that the amine then reacts with the residual elemental sulfur remaining in the stored composition before the amine will activate the dormant amine activatable curing agent, e.g. the zinc peroxide. Upon completion of reaction of the sulfur by the amine, the cure of the polymer in the composition with aid of the amine, as well as of water, proceeds substantially in the manner taught in 3,402,155, above. An excess of elemental sulfur, therefore, is detrimental to the curing rate of the composition. Accordingly, the total amount of stabilizing sulfur present in the composition must be much less than that stoichiometrically required to react with all the amine present in the molecular sieves. Stated another way, even after a prolonged storage period at elevated temperatures, the amount of amine remaining loaded in the molecular sieves must be sufficient in amount to react with the residual elemental sulfur, but still additionally be sufficient in amount to activate the dormant amine activatable curing agent. An amount of sulfur ranging between about 0.2 and about 1.0 parts by weight per 100 parts of liquid polythiol polymer is particularly preferred for practice of the invention, with the above considerations taken into account. Higher amounts may be used advantageously where amine loading is high and temperatures to be encountered in storage are unusually high.

As in the invention disclosed and claimed in 3,402,155, above, the molecular sieves loaded with basic compound useful in the polythiol polymer based composition of the present invention comprise a basic compound of the type which accelerates the cure of the curable polythiol polymer composition loaded in a molecular sieve. The molecular sieve inactivates the basic compound during the time the polymer based composition is in a moisture-free environment. Molecular sieves useful for the practice of this invention are those materials described generally as crystalline metal aluminosilicates which in the deydrated form have a stable three-dimensional network of $SiO_4$ and $AlO_4$ tetrahedra providing intracrystalline voids which are interconnected by access openings or pores of uniform size. The electrovalence of the tetradehdra containing aluminum is balanced by the inclusion in the crystal of a cation in particular, alkali metal or alkaline earth metal cations, especially sodium, potassium and calcium ions. The total void volume after dehydration is generally of the order of about 50%. These adsorbents are often referred to generally as zeolitic molecular sieves.

While there are a number of natural crystalline zeolites such as chabazite which have the above type of crystal structure and which may act as molecular sieves, most of these natural materials are unavailable in commercial quantities in sufficiently pure form, and in addition most have effective pore diameters which are too small for use in the invention. For this reason the synthetic zeolitic molecular sieves are much preferred for use in the present invention. These synthetic materials and their methods of manufacture are described in detail in publications and in the patent literature. See for example, Hersh, Molecular Sieves, Reinhold Publishing Corporation (1961) chapters, 5–7; Breck et al., J.A.C.S. vol. 78 pp. 5963–5977; and U.S. Patents 2,882,243 and 2,882,244.

The type of synthetic zeolitic molecular sieves described in U.S. Patents 2,882,243 and 2,882,244 are particularly suitable for use in the invention. Adsorbents of these types are commercially available e.g., from the Linde Division of Union Carbide Corporation under the designations, e.g., Molecular Sieve Types 4A, 5A, 10X and 13X, having effective pore diameters of 4A, 5A, 10A, and 13A, respectively (A=angstrom units).

The basic compounds which are useful in practice of the present invention are ones which can be loaded on molecular sieves so as to remain in a dormant state, while the loaded molecular sieves are in moisture-free surroundings, but which upon contact with moisture, such as is present in the atmosphere, will be readily displaced and thereby activated by the moisture. Exemplary of such basic compounds are the amines such as diethylene triamine, ethylene diamine, n-butyl amine, triethanol amine, triethylene tetraamine, dibutyl amine, tri-(dimethylaminomethyl) phenol, and piperidine. Especially preferred is ethylene diamine.

The amount of basic compound used will depend upon the amount of curable polythiol polymer in the composition, the amount of dormant curing agent present in the composition, the storage temperature of the packaged composition, the minimum shelf life desired, and the amount of elemental sulfur stabilizer contained in the composition in order to obtain the minimum shelf life, and like factors. Generally, the amount of basic compound will vary from about 1 part to about 15 parts by weight per 100 parts by weight of the polythiol polymers. In addition, the molecular sieves may be loaded with basic compounds at different percent loadings. It is theoretically possible to obtain up to about 50 wt. percent (i.e. 50 parts of base to 50 parts of molecular sieve) loading of base on the molecular sieve (thus filling all of the cavities in the molecular sieves with basic compound); however, the preferred percent loading is from about 2 to about 20 percent by weight of molecular sieve present in the composition.

Also, as in the invention of 3,402,155, above, the non-molecular sieve hygroscopic, accelerating agent useful in practicing this invention is preferably a desiccating agent which will not react with elemental sulfur under the contemplated shelf life conditions. As discussed above, some of these agents also serve as dormant moisture activatable co-curing agents. Examples of such desiccating, hygroscopic activating agents are alkali metal and alkaline earth metal oxides, peroxides, hydroxides and salts of weak acids such as sodium oxide, sodium peroxide, potassium hydroxide, sodium acetate, sodium molybdate, potassium formate, calcium oxide, barium oxide, calcium peroxide, barium peroxide, calcium hydroxide and strontium hydroxide; other inorganic salts such as ferric chloride, and sodium phosphate; polar organic solvents such as polyethylene glycol dibenzoate, the formal of the n-butyl monoether of diethylene glycol sold under the trademark butyl Carbitol formal, the adipate of the n-butyl monoether of diethylene glycol sold under the trademark Carbitol adipate, triphenyl phosphite, and combinations thereof. The polar hygroscopic organic solvents are particularly preferred because they serve also as a plasticizer and can be used in sizable amounts without detrimentally affecting the end properties of the cured composition of this invention. It should be noted that certain curing agents may also serve the dual function of a hygroscopic accelerating agent.

Compounds usually used as plasticizers may also be used in the presently claimed composition, and in some cases also serve as desiccating hygroscopic accelerating agents. Such plasticizers include chlorinated hydrocarbons, e.g., chlorinated biphenyls, phthalates, e.g. dibutyl phthalate, butyl benzyl phthalate and polyalkylene glycol benzoates, e.g., polyetyhlene glycol dibenzoate. About 10 to 150 parts by weight of the plasticizers may be used per 100 parts by weight of polymer.

The curable polythiol polymer based compositions and the primer compositions of the present invention may also contain various types of inert materials commonly employed in sealant and caulking compositions including adhesive additives such as phenolic and epoxy resins and organosilicon compounds; e.g. organosilanes, in amounts of about 0.1 to 10 parts by weight per 100 parts of polymer fillers; pigments; ultraviolet light stabilizers, cure inhibitors such as stearic acid, and/or reinforcing, agents such as carbon black, clays, slate flour, limestone, calcium carbonate, asbestine, aluminum oxide, titanium dioxide, zinc sulfide, silicon dioxide, magnesium silicate, iron oxide, and rayon floc. In general the use of these materials tends to decrease the elongation and increase the Shore hardness, toughness and tensile strength of the cured polymer systems. About 10 to 200 parts by weight of such materials may be used per 100 parts by weight of polymer.

Other additives that may be used, depending on the application, are perfumes, ultraviolet light stabilizers, thixotropic agents and cure retarders.

Preferably the curable composition is kept at a pH of from about neutral to slightly basic during the period of storage in a moisture-free environment by the use of suitable basic materials which are not used in a molecular sieve. However, the pH of the particular composition may be increased or decreased to achieve the desired balance between "package stability" and "cure rate." In general, increasing the basicity of the curable composition shortens both the package stability and the cure time of the particular curable composition involved.

Because of the presence of desiccating materials in the polymer composition of this invention, it is not necessary that the ingredients be completely moisture free; however, the preferred polymer composition is one which is substantially anhydrous, e.g. contains less than 0.3% by weight of moisture, since such a composition has better package stability than one with more moisture. Moreover, uniformity of product is more readily achieved by means of such an anhydrous composition.

The relative amounts of base loaded zeolitic molecular sieve; desiccating, hygroscopic accelerating agent; curing agent; elemental sulfur; and/or other ingredients admixed with the polythiol polymer may be varied substantially depending upon the molecular weight and/or chemical structure of the polymer; the relative freedom from moisture of the entire composition; the desired end use of the composition and other factors known to the art. Generally, however, it is desirable that the curing agent, both the amine and moisture activatable types, be present in at least stoichiometric amounts relative to the polthiol polymer in order to provide complete cure of the polymer composition. Furthermore, the amount of desiccating, hygroscopic accelerating agent or agents should be sufficient to provide a rapid cure upon exposure to moisture, such as moisture in the air. The amount of base loaded zeolitic molecular sieve may be varied over wide ranges but will generally be in sufficient amount to provide a composition having prolonged package stability under moisture-free conditions, but not with such large amounts as to substantially delay the rate of cure upon exposure of the polysulfide polymer composition to moisture. For example, where 100 parts by weight of polymer is used having a molecular weight of about 4000, the amount of desiccating, hygroscopic accelerating agent or agents will range from about 0.5 to about 50 parts by weight, and the amount of elemental sulfur will range from about 0.01 to about 4.9 parts by weight.

The following examples are given to illustrate the present invention more clearly and are not intended as a limitation upon the scope thereof.

Examples 1 and 2

| Ingredients: | Parts by weight |
|---|---|
| Liquid polysulfide polymer * | 100 |
| Polyalkylene glycol dibenzoate [1] | 25 |
| Chlorinated biphenyl [1] | 50 |
| Silica | 10 |
| Calcium carbonate | 80 |
| Titanium dioxide | 30 |
| Ethylene diamine on 5A molecular sieve (10% by wt.) [2] | 5 |
| Zinc peroxide [3] | 10 |

*The polymer used had essentially the structure:

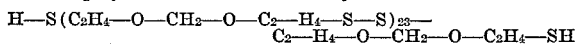

with about 0.5% cross-linking and an average molecular weight of about 4000.
[1] Hygroscopic accelerator and plasticizer.
[2] Non-hygroscopic accelerator.
[3] Dormant curing agent.

Two batches of the above composition were prepared by thoroughly mixing the ingredients in the given amounts using a stirring or a paint mill type of mixer. To study the effectiveness of sulfur as a stabilizer for such a compostiion, 0.5 part by weight sulfur was added to one batch of composition, designated Example 2. The other batch of composition, designated Example 1, served as the control and did not contain sulfur.

Package stability of the compositions was determined by placing the formulation in capped metal tubes and storing at room temperature (~73° F.), 105° F., 130° F. and 158° F. When the composition became too viscous to extrude, it was considered to have lost its package stability. The results of the test were as follows:

TABLE I

| Ex. No. | Sulfur, Parts by | Stability (days) | | | |
|---|---|---|---|---|---|
| | | R. T. | 105° F. | 130° F. | 158° F. |
| 1 | | 82+ | 6 | 2 | 2 |
| 2 | 0.5 | 82+ | 82+ | 82+ | 82+ |

Examples 3 and 5

| Ingredients | Parts by Weight | | |
|---|---|---|---|
| | Ex. 3 | Ex. 4 | Ex. 5 |
| Liquid polysulfide polymer * | 100 | 100 | 100 |
| Calcium carbonate | 25 | 25 | 25 |
| Kaolin clay | 30 | 30 | 30 |
| Butyl benzyl phthalate [1] | 15 | 15 | 15 |
| Polyalkylene glycol dibenzoate [1] | 15 | 15 | 15 |
| Silica | 6 | 6 | 6 |
| Titanium dioxide | 15 | 15 | 15 |
| Ethylene diamine on 5A molecular sieve (10% by wt.) [2] | 8 | 8 | 8 |
| Zinc peroxide [3] | 10 | 10 | 10 |
| Lithium peroxide | | | 1 |
| Sulfur [5] | | 0.3 | 0.3 |

* Same type polymer as in Examples 1 and 2.
[1,2,3] Same as in Examples 1+2.
[4] Co-curing agent.
[5] Stablizer.

The above formulations were prepared and tested using the same procedures described in Examples 1 and 2 above. Package stability as determined for Examples 3 to 5 is given in Table II below.

TABLE II

| Ex. No. | Sulfur, Parts by | Stability (days) | | | |
|---|---|---|---|---|---|
| | | R. T. | 105° F. | 130° F. | 158° F. |
| 3 | | 36+ | 15 | 2 | 2 |
| 4 | 0.3 | 36+ | 36+ | 36+ | 36+ |
| 5 | 0.3 | 36+ | 36+ | 36+ | 36+ |

Example No. 6

| Ingredients: | Parts by weight |
|---|---|
| LP32, liquid polysulfide polymer * | 100 |
| Thixcin–R | 7 |
| Calcium carbonate | 57 |
| Titanium dioxide | 15 |
| Aroclor 1254 [1] | 6 |
| Santicizer 160 [1] | 25 |
| Sulfur [5] | 0.3 |
| Zinc peroxide [3] | 8.0 |
| Lithium peroxide [4] | 0.75 |
| Ethylene diamine on 5A molecular sieve (10% by wt.) [2] | 2.0 |

*Same type polymer as in Examples 1–5.
Thixcin–R is a thixotropic agent.
Aroclor 1254 is a chloroinated diphenyl.
Santicizer 160 is butyl phthalate.
[1,2,3,4,5] Same as in Examples 3–5.

The above materials were weighed in a dry box at about 4% relative humidity. They then were mixed in a planetary mixer under vacuum for about 25 minutes. They were given a final blending in a paint mill. Mixing temperature was in the range of 100 to 110° F.

Package stability of the composition of Example 6 was determined as in Examples 1–5 by packaging the composition in a large number of capped metal paste tubes and storing quantities of the filled tubes at various temperatures, specifically at room temperature (about 75° F.), 105° F., 130° F., 158° F., and 180° F.

The results of the package stability tests were as follows:

| Temperature | Days at Temperature | Extrudability at Days |
|---|---|---|
| Room temperature | 395+ | Easy. |
| 105° F | 250+ | Do. |
| 130° F | 240– | Do. |
| 158° F | 90–120 | Hard. |
| 180° F | 16–21 | Do. |

The days for curing the composition to different stages of cure at room temperature at different percentages of humidity were as follows:

| Cured Stage | Percent Relative Humidity | Days |
|---|---|---|
| Skin formed | 30 | 16–21 |
| Do | 50 | 1 |
| Do | 90 | 1 |
| Tack free | 30 | 1–3 |
| Do | 50 | 1 |
| Do | 90 | 1 |
| Completely cured beads | 30 | 36–41 |
| Do | 50 | 21–27 |
| Do | 90 | 12–14 |
| Completely cured channels | 30 | 38–43 |
| Do | 50 | 21–27 |
| Do | 90 | 16–21 |

Example No. 7

In contrast to the excellent package storage life of the composition of Example No. 6, a similar formulation differing only in that no elemental sulfur was present became unusable, i.e. difficult to extrude, after less than 2 days storage at 130° F.

Example No. 8–11

Compositions were prepared as in Example No. 6 in which calcium peroxide was substituted for the lithium peroxide in the same amount and the amount of sulfur present was varied from 0 to 0.075 part per 100 of polymer. Package stabilities of the various test materials were as follows:

| Example No. | Parts Sulfur by Weight | Storage Temp., °F | Time to Hard Extrudability |
|---|---|---|---|
| 8 | 0 | 130 | 18 hours. |
|   |   | 158 | Do. |
|   |   | 180 | 4 hours. |
| 9 | 0.03 | 130 | 2½ days. |
|   |   | 158 | 5 to 15 hours |
|   |   | 180 | 4 hours |
| 10 | 0.04 | 130 | 27 days |
|   |   | 158 | 20 hours |
|   |   | 180 | 3-4 hours |
| 11 | 0.075 | 130 | 99 days. |
|   |   | 158 | 40-47 days. |
|   |   | 180 | 16-19 days. |

I claim:
1. A stable, unitary liquid polymer composition protected from moisture and capable of being shipped and stored in a single closed container at elevated ambient temperature and later being deposited in place without agitation or intermixing with other material for complete curing by contact of its surface with surroundings containing essentially only moisture, comprising essentially,
   (a) a normally liquid polythiol polymer containing at least two terminal mercaptan groups per polymer molecule and capable of undergoing further polymerization, under oxidative reaction conditions, to form a normally solid polymer containing recurring disulfide groups derived from oxidative coupling of the mercaptan groups;
   (b) at least one dormant amine and moisture activatable oxidizing curing agent in an amount sufficient to cure the liquid polythiol polymer, or in admixture with a dormant moisture activatable oxidizing curing agent sufficient in amount therewith to cure said polymer;
   (c) at least one desiccating, hygroscopic accelerating agent adapted and sufficient to maintain the polymer composition in dry condition during shipment and storage and to absorb moisture from its surroundings after deposition in place;
   (d) an amine-loaded molecular sieve adapted to remain dormant in the absence of moisture and to undergo displacement of the adsorbed amine when the polymer composition is exposed to moisture; and
   (e) elemental sulfur in a stabilizing amount sufficient to deter curing of the polymer by said oxidizing curing agent in the substantial absence of adsorbed moisture.

2. The polymer composition according to claim 1, in which the normally liquid polythiol polymer is a polythiopolymercaptan polymer represented by the formula $$SH(R\text{—}S\text{—}S)_nRSH$$

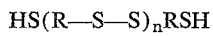

in which R represents a divalent substituent selected from the group consisting of hydrocarbon, oxahydrocarbon or thiahydrocarbon groups, and $n$ is an integer in the range from about 2 to 70.

3. The polymer composition according to claim 1, in which the normally liquid polythiol polymer is a mercaptan-terminated polythiomethylene polymer.

4. The polymer composition according to claim 1, in which the normally liquid polythiol polymer is a mercaptan-terminated polyoxyalkylene glycol polymer.

5. The polymer composition according to claim 1, in which the amine contained in the amine-loaded molecular sieve is selected from the group consisting of diethylene triamine, ethylene diamine, n-butyl amine, triethanol amine, triethylene tetramine, dibutyl amine, tri-(di-methylaminomethyl) phenol, and piperidine.

6. The polymer composition according to claim 1, in which the dormant curing agent is an amine activatable oxidizing agent selected from the group consisting of zinc oxide, zinc peroxide, or mixtures thereof.

7. The polymer composition according to claim 1 in which the amount of elemental sulfur is from about 0.01 to about 4.9 parts per 100 parts by weight of the liquid polythiol polymer and the amount of amine-loaded molecular sieve is from about 0.5 to about 50 parts by weight of which from about 2 to about 50% is amine.

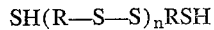

8. The polymer composition according to claim 1 in which the amount of elemental sulfur is from about 0.075 to about 3.5 parts per 100 parts by weight of the liquid polythiol polymer and the amount of amine-loaded molecular sieve is from about 0.5 to about 15 parts by weight of which from about 2 to about 50% is amine.

9. The polymer composition according to claim 1 in which the amount of elemental sulfur is from about 0.03 to about 0.5 part per 100 parts by weight of the liquid polythiol polymer and the amount of amine-loaded molecular sieve is from about 0.5 to about 15 parts by weight of which from about 2 to about 50% is amine.

10. The polymer composition according to claim 1 in which there are present per 100 parts by weight of liquid polythiol polymer;
   (a) from about 2 to about 25 parts by weight of dormant amine and moisture activatable curing agent;
   (b) from about 0.5 to about 50 parts by weight of desiccating hygroscopic accelerating agent;
   (c) from about 0.5 to about 50 parts by weight of amine-loaded molecular sieve in which the amine is from about 2 to about 50% of the weight of the loaded sieve:
   (d) from about 0.01 to about 4.9 parts by weight of elemental sulfur; and
   (e) from about 10 to 200 parts by weight of inert material.

11. A stable, unitary, liquid polymer composition protected from moisture and capable of being shipped and stored in a single closed container at elevated ambient temperatures and later being deposited in place without agitation and intermixing with other material for complete curing by contact of its surface with surrounding containing essentially only moisture, comprising essentially
   (a) a normally liquid polythiopolymercaptan polymer represented by the formula $$HS(R\text{—}S\text{—}S)_nRSH$$

in which R represents a divalent substituent selected from the group consisting of hydrocarbon, oxahydrocarbon, and thiahydrocarbon groups, and $n$ is an integer from about 2 to 70;
   (b) at least one dormant moisture activatable oxidizing agent in an amount sufficient to cure the polythiopolymercaptan polymer, the dormant curing agent being selected from the group consisting essentially of zinc oxide, zinc peroxide, or mixtures thereof with each other or of either or both with at least one moisture activatable co-curing agent selected from the group consisting of alkali metal and alkaline earth metal peroxides and dioxides, lead peroxide, and manganese dioxide;
   (c) a desiccating, accelerating agent adapted and sufficient to maintain the polymer composition in dry condition during shipment and storage and to absorb moisture from its surroundings after deposition in place;
   (d) an amine-loaded molecular sieve adapted to remain dormant in the absence of moisture and to undergo displacement of the adsorbed amine when the polymer composition is exposed to moisture, the adsorbed amine being selected from the group consisting of ethylene triamine, ethylene diamine, n-butyl amine, triethanol amine, triethylene tetramine, dibutyl amine, tri-(dimethylaminomethyl) phenol, and piperidine; and
   (e) elemental sulfur in a stabilizing amount sufficient to maintain the composition in an uncured state in a closed container at an elevated ambient temperature for a prolonged period of time while permitting the polymer to cure at an acceptable rate on exposure to moisture.

12. The polymer composition according to claim 11 in which the dormant moisture activatable oxidizing curing agent is zinc peroxide.

13. The polymer composition according to claim 11 in which the dormant moisture activatable oxidizing curing agent consists essentially of an admixture of calcium peroxide with zinc oxide, zinc peroxide, or mixtures thereof with each other.

14. The polymer composition according to claim 11 in which the desiccating hygroscopic accelerating agent is a polar organic solvent selected from the group consisting of polyethylene glycol dibenzoate, butyl benzyl phthalate, and chlorinated biphenyl.

15. A curable polymer based composition comprising, in weight ratio, 100 parts by weight of polymercaptan containing polymer, about 2 to 25 parts by weight of at least one zinc compound selected from the group consisting of zinc oxide and zinc peroxide, about 0.5 to about 50 parts by weight of amine-loaded molecular sieve in which the amine is from about 2 to about 50% of weight of the loaded sieve, and about 0.03 to about 0.5 part by weight of elemental sulfur.

16. A curable composition as in claim 15 in which said zinc compound is zinc peroxide.

17. A curable composition as in claim 15 which further comprises 0.5 to 10 parts by weight of at least one amine.

18. A curable composition as in claim 15 further comprising about 0.5 to 20 parts by weight of at least one co-curing agent for polymercaptan polymers which is moisture activated.

19. A curable composition as in claim 18 in which at least one of said moisture activated co-curing agents is lithium peroxide.

20. A curable composition as in claim 18 in which at least one of said moisture activatable co-curing agents is calcium peroxide.

References Cited

UNITED STATES PATENTS

| | | | |
|---|---|---|---|
| 3,225,017 | 12/1965 | Seegman et al. | 260—79.1 |
| 3,234,188 | 2/1966 | Warner | 260—79 |
| 3,331,818 | 7/1967 | Bertozzi | 260—79.1 |
| 3,402,151 | 9/1968 | Kutch | 260—77.5 |
| 3,402,155 | 9/1968 | Kutch | 260—79 |
| 3,046,248 | 7/1962 | Molnar | 260—31.8 |

HOSEA E. TAYLOR, JR., Primary Examiner

M. I. MARQUIS, Assistant Examiner

U.S. Cl. X.R.

117—139.5, 142; 260—37, 45.7, 79, 79.1, 830, 838